United States Patent Office 3,365,296
Patented Jan. 23, 1968

3,365,296
LIGHT-SENSITIVE ULTRAVIOLET ABSORBING COMPOUNDS AND DIAZOTYPE MATERIALS CONTAINING THE SAME

Robert J. Cox, Los Gatos, Calif., and Theodore Panasik, Vestal, N.Y., assignors to General Aniline & Film Corporation, New York, N.Y., a corporation of Delaware No Drawing. Filed May 18, 1964, Ser. No. 368,379
6 Claims. (Cl. 96—91)

The present invention relates to light-sensitive diazotype materials containing ultraviolet absorbing compounds and particularly the utilization of such compounds, the ultraviolet absorbing properties of which are destroyed by exposure to actinic light.

The incorporation of ultraviolet light absorbers in diazotype materials has been adopted for the purpose of copying continuous tone originals. However, while the incorporation of the ultraviolet absorbers permits the attainment of this result, the residual ultraviolet absorber which remains in the print slows down the reprint speed. In addition, the retained ultraviolet absorber causes background yellowing of the print.

It is an object of this invention to provide diazotype materials with U.V. absorbers suitable for continuous tone copying but resulting in prints having faster reprint speeds.

A further object is to provide ultraviolet absorbing compounds suitable for use in the stated relationship but resulting in prints having less yellow backgrounds.

Other objects will become apparent as the description proceeds.

It has been ascertained that the above objects may be achieved by incorporating into diazotype materials U.V. absorbers which are effective in screening out radiation in the 300 to 460 mμ range but which upon being struck by actinic radiation are modified so that they are no longer capable of absorbing light in the above range.

Compounds meeting these prerequisites are those represented by the following structural formulae:

$$R-(CH=CH)_n-CH=N-NH-R$$

$$R-CH=\overset{\overset{O}{\uparrow}}{N}-R$$

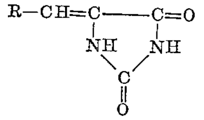

wherein R is aryl, such as phenyl, naphthyl, styryl, acyloxyphenyl, such as acetoxyphenyl, benzoxyphenyl, or the like, alkoxyphenyl, such as methoxyphenyl, ethoxyphenyl, propoxyphenyl, or the like, halophenyl, such as chlorophenyl, bromophenyl, or the like, phenylnitrone, naphthylnitrone or the like, thienyl or furyl; and $n$ is 1 or 2.

Examples of compounds within the above classification are:

(1) Cinnamaldehyde phenylhydrazone

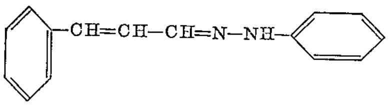

(2) N,N'-diphenyl-alpha, alpha'-dinitrone

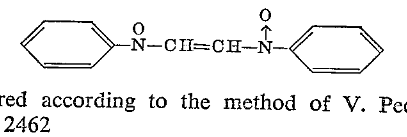

Prepared according to the method of V. Pechmann, Ber. 30, 2462

(3) N-p-benzoxyphenyl-alpha-styrylnitrone

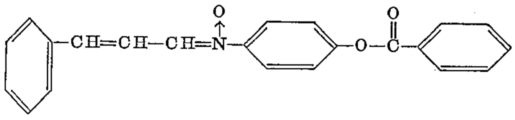

(4) 5-benzylidenehydantoin

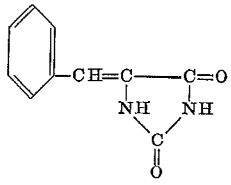

Prepared according to the method disclosed in J. Am. Chem. Soc., 37, 385, (1915)

(5) 5-phenyl-1-pentadienal phenylhydrazone

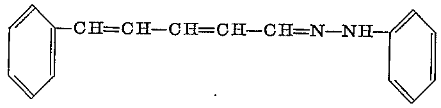

Prepared according to Ber., 58B, 1284–90 (1925) by the condensation of phenylhydrazine and 5-phenyl-1-pentadienal, M.P. 170–2° C.

(6) 1-naphthaleneacrolein phenylhydrazone

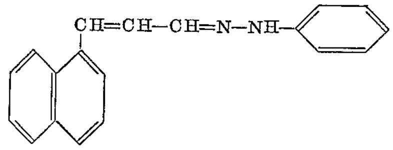

Prepared according to Chem. Ber., 91, 1867–81 (1958), M.P. 125–6° C.

(7) Cinnamaldehyde-1-naphthylhydrazone

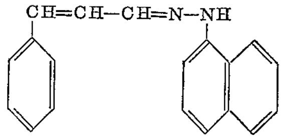

Prepared according to Atti reale accad. naz. Lincei (5) 18 II, 270, M.P. 165° C.

(8) 2-furanacrolein phenylhydrazone

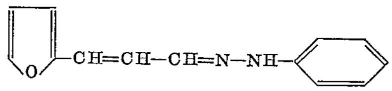

Prepared according to Bull. Soc. Chim. France, 35, 1658–65 (1924)

(9) alpha-p-methoxyphenyl-N-phenylnitrone

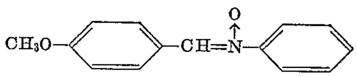

Prepared according to Ann., 367, 272 by the condensation of anisaldehyde and N-phenylhydroxylamine in ethanol, M.P. 116.5–117.5° C.

(10) N-phenyl-alpha-2-thienylnitrone

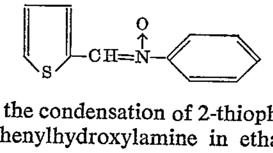

Prepared by the condensation of 2-thiophenecarboxaldehyde and N-phenylhydroxylamine in ethanol, M.P. 89–90.5° C.

(11) alpha-1-naphthyl-N-phenylnitrone

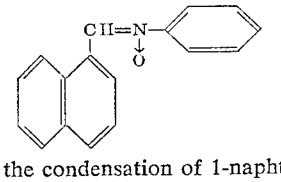

Prepared by the condensation of 1-naphthaldehyde and N-phenylhydroxylamine in ethanol, M.P. 133–135° C.

(12) 5-(o-chlorobenzylidene)hydantoin

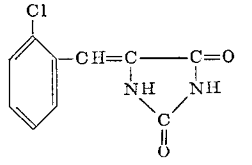

Prepared according to J. Am. Chem. Soc., 62, (1940) by the condensation of o-chlorobenzaldehyde and hydantoin in glacial acetic acid, acetic anhydride and fused sodium acetate; M.P. 275° C.

(13) 5-furfurylidenehydantoin

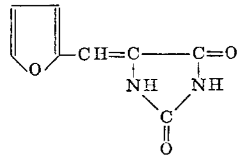

Prepared according to Am. Chem. J. 45, 380 (1911), M.P. 232° C.

*Spectral characteristics of first four compounds*

TABLE I

| Compound Name (Solvent) | Wave-length of Max. Absorption, mμ | Molar Absorptivity |
|---|---|---|
| (1) Cinnamaldehyde phenylhydrazone (ethanol) | 360 | $3.93\times10^4$ |
| (2) N,N'-diphenyl-alpha, alpha-dinitrone (ethanol) | 385 | $2.57\times10^4$ |
| (3) N-p-benzoxyphenyl-alpha-styryl-nitrone (chloroform) | 360 | $2.74\times10^4$ |
| (4) 5-benzylidenehydantoin (ethanol) | 315 | $2.25\times10^4$ |

The ultraviolet light absorbers may be incorporated in the sensitizing solution or in a wide variety of organic carrier base materials, particularly, compositions which are water-white or substantially colorless, including film-forming plastics or resins.

The ultraviolet light absorbers may be incorporated into solutions or dopes of said film-forming materials by forming a solution of the ultraviolet light absorbers in a suitable solvent mutually compatible with the dope, casting, coating or otherwise treating this solution to form a sheet or foil and, finally, driving off the solvent.

The amount of ultraviolet light absorbers to be employed in the foregoing coatings is not critical, and the actual concentration to be employed may be very readily determined by a simple trial experiment. It will be appreciated that each type of material may require an amount which will differ from a closely analogous material. For practical purposes, it has been found that the amount may range from 0.1 percent to 5 percent based on the dry weight of the coating material.

Any of the usual light-sensitive diazonium compounds may be employed and, in this connection, reference is made to the compounds referred to U.S.P. 2,501,874, and in the article by Van der Grinten, Photographic Journal, vol. 92B, 1952, page 46. The stabilized diazos from N,N-disubstituted p-phenylenediamines are most satisfactory. Examples of such diazos are those derived from N,N-diethyl-p-phenylenediamine; N - benzyl - N-ethyl-p-phenylenediamine; N-ethyl-p-phenylenediamine; N-phenyl-p-phenylenediamine; N,N-diethyl-2-ethoxy-p - phenylenediamine; N-ethyl-2-methyl-p-phenylenediamine; N,N-bis(2-hydroxyethyl)-p-phenylenediamine; N - 2-hydroxyethyl-N-methyl-p-phenylenediamine and the like. According to customary procedure, these diazos are used in the form of salts stabilized with zinc chloride, tin chloride, cadmium chloride and the like.

The comments with regard to the diazonium compounds apply equally to the coupling components. Thus, any of the usual coupling components are satisfactory for our purpose. Examples of such couplers are 2,5-xylenol; 2,3-dihydroxynaphthalene; 1,8-dihydroxynaphthalene; resorcinol; octyl resorcinol; 3-methyl-4-phenyl-5-pyrazolone; the amide of alpha-resorcylic acid; H acid; acetoacetanilide; 6,7-dihydroxynaphthalene-α-sulfonic acid and the like. Other couplers are mentioned in the Van der Grinten article supra.

The coating solution, in addition to the ultraviolet light absorbers and light-sensitive diazo may contain the various adjuncts usual in the manufacture of light-sensitive diazotype materials. These include metal salts for intensification of the dyestuff image, such as ammonium sulfate, nickel sulfate, zinc chloride and the like; stabilizing agents such as thiourea, thiosinamine, naphthalenetrisulfonic acid and the like; acids acting to retard precoupling such as acetic acid, boric acid, tartaric acid and the like; hygroscopic agents such as glycol, glycerol and the like; and wetting agents such as saponin, lauryl sulfonate, butylbenzene sulfonate, the oleic acid amide of N-methyl taurine and the like.

In producing a diazotype light-sensitive layer from coating solutions containing the ultraviolet absorber compounds of this invention, the base or support material is dipped, brushed or sprayed with the sensitizing or coating solution by means known to the art, the particular type of application depending upon the carrier employed. Where paper is used as the base for the light-sensitive coating, the coating solution is generally applied by using trough and doctor blade, the paper being drawn past the trough and excess solution being scraped off with the doctor blade. The paper may also be brushed or sprayed with the coating solution. When a film material is used as the support, in order to obtain proper penetration of the active agents, solvents or swelling agents are added to the coating solution and the solution is generally applied by dipping.

The following examples will serve to further illustrate the preparation of diazotype photoprinting materials from the ultraviolet absorber compounds of this invention, it being understood that the invention is not limited to the particular materials or proportions therein described. Unless otherwise specified, the parts are by weight.

EXAMPLE I

The following solution was prepared:

| | | |
|---|---|---|
| Acetone | ml | 70 |
| Cellulose acetate | g | 0.4 |
| 2-methoxyethanol | ml | 30 |
| Sulfosalicylic acid | g | 1.4 |
| Zinc chloride | g | .16 |
| 3,3'-dihydroxy-2-naphthanilide | g | .51 |
| m,m'-Ethylenedioxydiphenol | g | 1.6 |
| 4,4'-diresorcinol | g | 0.12 |
| p-Diethylaminobenzenediazonium chlorozincate | g | 0.23 |
| 5-benzylidenehydantoin (U.V. absorber) | g | 1.25 |

This solution was coated on cellulose triacetate base and the dried film was exposed to a mercury arc under a transparent microfilm image. Upon development with ammonia this gave a black reproduction of the original with clear non-image areas. When used as the original in the preparation of a second generation diaztoype, this print, when compared with a print obtained from a conventional continuous tone formulation containing 2,2'-dihydroxy-4,4'-dimethoxybenzophenone as the ultraviolet light absorber, could be exposed a much shorter time to give diazotype prints of equal density.

A solution of this compound coated on a cellulose acetate base was shown by spectrophotometric methods to have decomposed 76% after two passes through a white-print machine at speed 3 (3 ft. per minute).

EXAMPLE II

The coating solution of Example I was modified by substituting 1.25 grams of N,N'-diphenyl-alpha,alpha'-dinitrone as the U.V. absorber. The solution was coated on cellulose acetate film and was shown by spectrophotometric methods to have decomposed 96% after one pass through a white-print machine at speed 5.

The coated film also had the desirable property of a faster reprint speed in a diazotype process.

EXAMPLE III

The coating solution of Example I was modified by the substitution of 1.25 grams of N-p-benzoxyphenyl-alpha-styryl-nitrone as the U.V. absorber.

The coating solution containing the ultraviolet light absorber was coated on a cellulose acetate film and was found by spectrophotometric methods to have been 90% decomposed after one pass through a white-print machine at speed 5.

The films prepared using this compound had the expected faster reprint property.

EXAMPLE IV

The coating solution of Example I was modified by the substitution of 1.25 grams of cinnamaldehyde phenylhydrazone as the U.V. absorber.

The solution was coated on cellulose triacetate base and the dried film treated in accordance with the procedure outlined in Example I. The diazotype coating displayed the expected increase in reprint speed.

A cellulose acetate film coated with a solution containing this compound was shown by spectrophotometric methods to have been 11% decomposed after one pass through a white-print machine at speed 5.

EXAMPLE V

The procedure was the same as in Example I excepting there was used cinnamaldehyde 1-naphthylhydrazone as the U.V. absorber.

The results on processing were substantially the same as in Example I.

EXAMPLE VI

The procedure was the same as in Example I excepting that the U.V. absorber employed was N-phenyl-alpha-2-thienyl-nitrone.

The results were about the same as in Example I.

EXAMPLE VII

The procedure was the same as in Example I excepting that the U.V. absorber was 5-(α-chlorobenzylidene) hydantoin.

The favorable results of Example I were obtained in this instance.

Other modifications of the invention will occur to persons skilled in the art. Thus, any of the U.V. absorbers previously mentioned may be utilized in lieu of those of the examples with equally good results.

We do not, therefore, intend to be limited in the patent granted except as necessitated by the appended claims.

What is claimed is:

1. A diazotype material comprising a base coated with a sensitive composition containing a light-sensitive diazonium compound and an ultraviolet absorber which is decomposed by actinic radiation and which is selected from the class consisting of those represented by the following formulae:

$$R-(CH=CH)_n-CH=N-NH-R$$

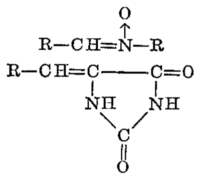

wherein R is selected from the class consisting of aryl, furyl and thienyl and *n* is a whole number, not greater than 2.

2. The article as defined in claim 1 wherein the ultraviolet absorber is cinnamaldehyde phenylhydrazone.

3. The article as defined in claim 1 wherein the ultraviolet absorber is N,N'-diphenyl-alpha,alpha'-dinitrone.

4. The article as defined in claim 1 wherein the ultraviolet absorber is N-p-benzoxyphenyl-alpha-styryl-nitrone.

5. The article as defined in claim 1 wherein the ultraviolet absorber is 5-benzylidenehydantoin.

6. The article as defined in claim 1 wherein the sensitive composition contains a coupling component.

References Cited

UNITED STATES PATENTS

| | | | |
|---|---|---|---|
| 2,245,628 | 6/1941 | Von Poser et al. | 96—91 X |
| 3,069,268 | 12/1962 | Herrick et al. | 96—75 X |

FOREIGN PATENTS

| | | |
|---|---|---|
| 643,042 | 9/1950 | Great Britain. |

NORMAN G. TORCHIN, *Primary Examiner.*

C. L. BOWERS, Jr., *Assistant Examiner.*